Figure 1:
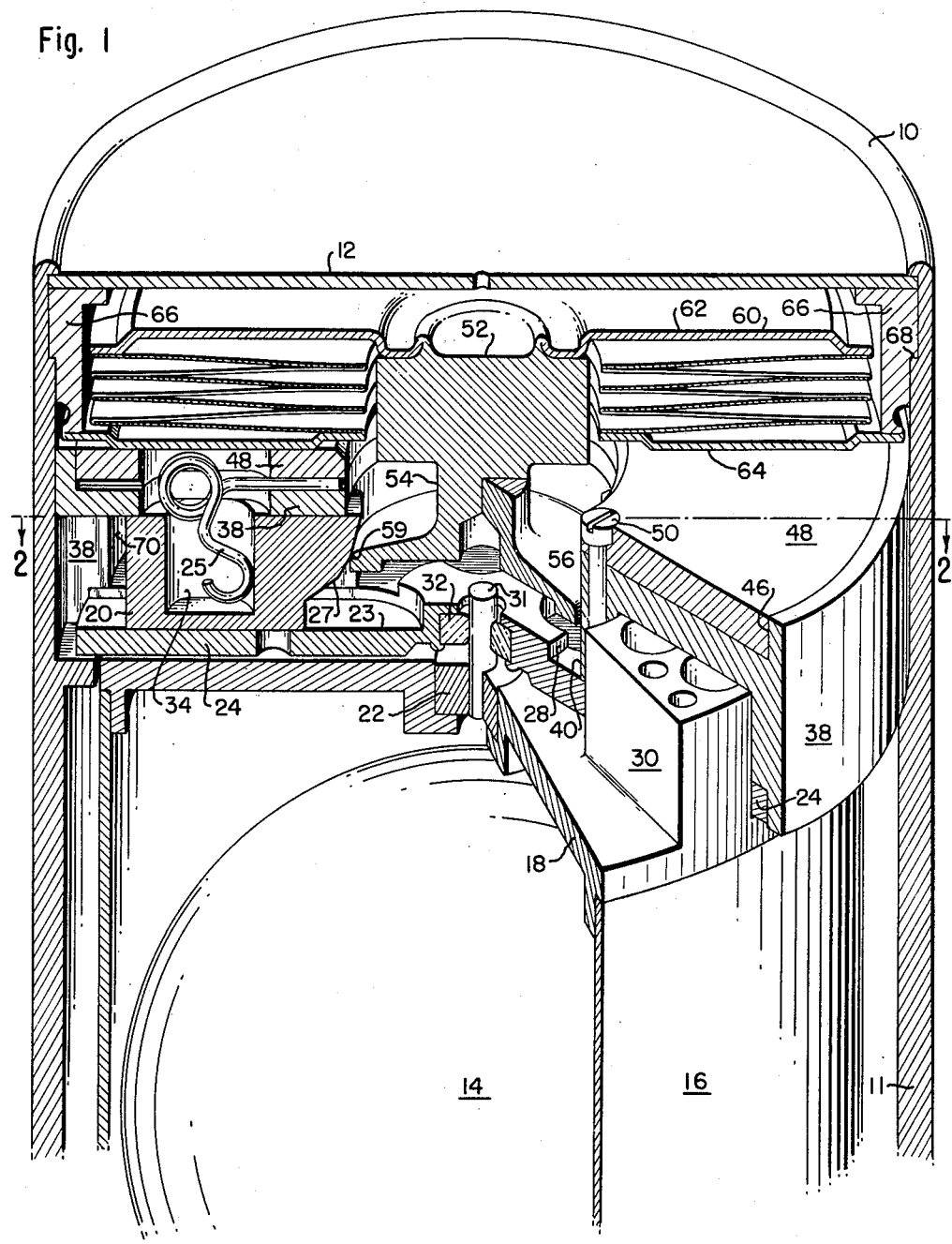

Dec. 16, 1958   R. G. HAAGENS ET AL   2,864,256
DAMPING DEVICE

Filed Dec. 21, 1956   3 Sheets-Sheet 1

INVENTORS
ROBERT G. HAAGENS
EDWARD L. SWAINSON
BY
Kenway, Jenney, Witter & Hildreth

ATTORNEYS

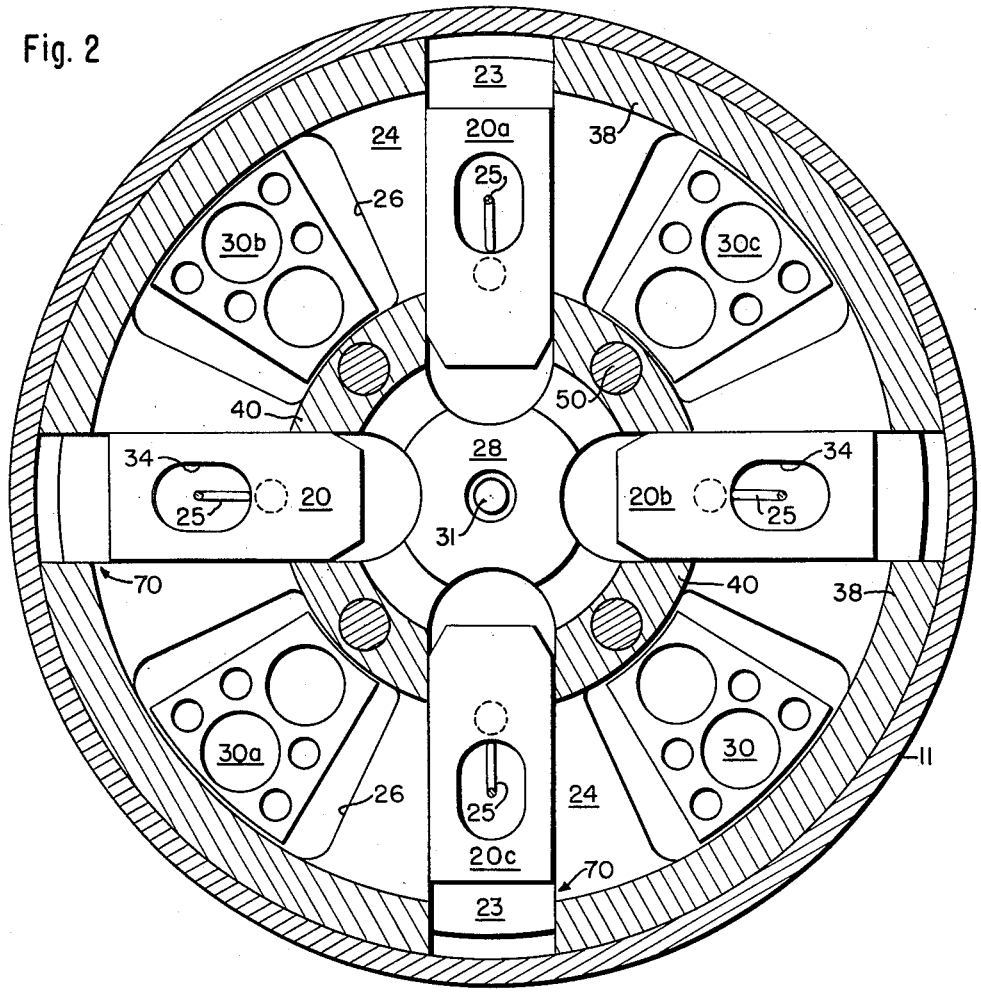

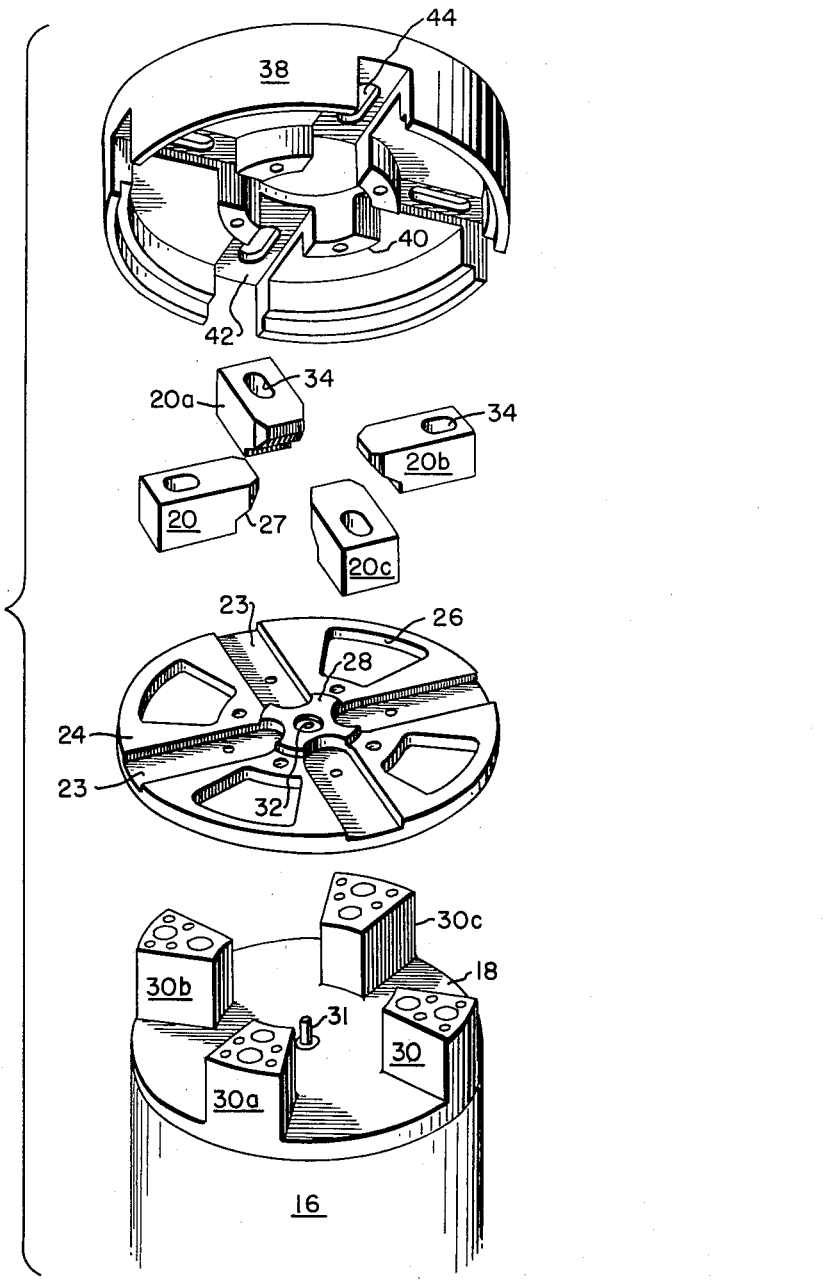

United States Patent Office 2,864,256
Patented Dec. 16, 1958

2,864,256

DAMPING DEVICE

Robert G. Haagens, Concord, and Edward L. Swainson, Newtonville, Mass., assignors, by mesne assignments, to American Radiator & Standard Sanitary Corporation, New York, N. Y., a corporation of Delaware Application December 21, 1956, Serial No. 629,850

14 Claims. (Cl. 74—5.5)

This invention relates to damping devices and in particular to a device for providing fluid damping automatically compensated for variations in the viscosity of the damping medium.

Precision instruments of various kinds require damping in order to perform accurately, particularly gyroscopes, accelerometers, and the like wherein the movement of masses is utilized to measure velocity and other functions. A good extmple of the problem is found in the field of gyroscopes mounted within housings filled with oil or other liquid.

The presence of the liquid within the housing obviously makes it desirable to utilize a liquid damping system, and several different types have been developed, usually including vanes or blades attached to the moving mass and operating against the resistance offered by the liquid. Various combinations of valve-controlled passages and interconnected chambers have been developed in order to provide means for varying the amount of damping in controlled fashion.

The most perplexing problem encountered is that which arises from the fact that the viscosity of fluids, such as silicone oils, varies with changes in ambient temperature. In the absence of means responsive to temperature changes for varying the amount of damping, the damping force will be found to be very high at low temperatures and to fall off rapidly with an increase in temperature, through a curve of non-linear configuration. Therefore in order to provide a system in which the damping force is constant it is necessary to make use of means for introducing into the system a controlled damping force which varies in the opposite direction to the variation of the "natural" damping force and through a curve which is the reciprocal of the curve of variation of the natural damping force, the result being that for all temperatures the sum of the "natural" damping force and the controlled damping force will be the same.

The primary object of the invention is to provide a damping system for an instrument responsive to the movement of a mass wherein the total damping force of the system is constant over the range of temperatures normally to be encountered in use.

Another object of the invention is to provide a constant damping system comprised of elements which may be housed in minimum volume, in order to avoid the expense and loss of efficiency which comes from oversize components, volume being critical in environments such as instruments for aircraft where weight and space are at a premium.

Another object of the invention is to provide a satisfactory damping system which is rugged enough to withstand shocks and accelerations of considerable magnitude.

An important feature of the invention comprises walls providing passages or conduits for damping liquid in combination with a plurality of vanes mounted for friction-less movement in the damping liquid, and a plurality of sliding gates movable to vary the effective volume of the liquid passages, the position of the gates being responsive to a temperature or volume of the liquid.

Another feature of the invention resides in a plunger having a bearing surface cooperating with cam surfaces on the gates, and temperature or volume responsive means for reciprocating the plunger in order to vary the position of the sliding gates.

These and other objects and features of the invention will be more readily understood and appreciated from the following detailed description of a preferred embodiment thereof selected for purposes of illustration and shown in the accompanying drawings, in which:

Fig. 1 is a view partly in elevation of a damping device constructed in accordance with the invention, with portions shown in section and perspective, Fig. 2 is a view in cross-section along the line 2—2 of Fig. 1, and Fig. 3 is an exploded view in perspective of the most essential parts of a damping device constructed in accordance with the invention.

By way of example we shall describe a damping device found particularly useful when incorporated in a gyroscope, and those skilled in the art will readily appreciate the slight changes required to adapt the unit for use in other instrumental environments.

The gyroscope and damping system are housed within a cylindrical metal casing 11, one end of which is closed by a flat metal disk 12 held in place by a bead or rolled edge 10 on the rim of the casing 11. The elements of the gyroscope per se form no part of this invention and are merely indicated on Fig. 1 as including a motor assembly 14 and an enveloping gimbal structure 16 including an inner cylindrical casing terminating at its upper end in a flat metal plate 18 provided at its center with a bushing 22 carrying a pivot pin 31 concentric with the casings 11 and 16.

Projecting upwardly from the plate 18 of the gimbal structure are four symmetrically disposed, radially extending, wedge-shaped segments 30, 30a, 30b and 30c. These segments serve as vanes for the damping system and are, of course, rotated in response to the action of the gyroscope 14 within the casing 16. The arrangement of the vanes or segments is best shown at the bottom of Fig. 3. Holes may be bored into the segments 30 in order to lighten the assembly and also to provide a proper static and dynamic balance.

Superposed on the plate 18 is an essentially flat metal disk 24 provided with four large, wedge-shaped slots 26 disposed symmetrically about the center of the disk 24 and dimensioned to fit over the vanes 30 closely but with clearance in the radial direction. The wedge-shaped slots are made wide enough to permit relative rotation of the disk 24 with respect to the plate 18 through perhaps 10 degrees. At the center of the disk 24 there is provided a bearing 32 cooperating with the pivot pin 31 to maintain concentricity of plate 18 and vanes 30, 30a, 30b and 30c with respect to disk 24. Surrounding the bearing 32 is a boss 28 having four symmetrically arranged arcuate surfaces forming the ends of four radial tracks or guideways 23 made by cutting slots part way through the disk 24.

Mounted to slide in the tracks 23 are four blocks 20, 20a, 20b and 20c; the inner end of each block 20 is carefully profiled, as shown at 27 in Fig. 1 to form a cam surface having a configuration matching that of the curve of damping force variation found suitable for the particular instrument. Each of the blocks 20, 20a, 20b and 20c is provided with a hole 34 bored from the upper surface of the block and serving to receive one end of a torsion spring 25 arranged to urge the block inwardly along the track 23 toward the center of the disk 24.

Disposed above the blocks 20 and the disk 24 is a cup-shaped member 38, best shown in Fig. 3 and comprising a flat annular upper plate having a peripheral depending flange slotted at four places to communicate with four guideways or tracks 42 cut as radial slots in the bottom surface of the annulus and arranged radially and symmetrically about the axis of the annulus for cooperating with the upper portions of the blocks 20, 20a, 20b and 20c; the result being that each block 20 is mounted both at the top and the bottom in radial tracks or guideways. Since the blocks 20, etc. function as valve gates in the damping system, it will be convenient hereafter to refer to them as gates. It should be noted that the four vanes 30, 30a, 30b and 30c form with the member 38 four chambers each of which is divided in two by the gates 20, 20a, 20b and 20c, the two parts of each chamber being in communication through passages formed by the outer ends of the gates and the slots formed in the depending flange of the member 38. In other words the gates serve as slidable partitions sub-dividing each chamber. The radial position of each gate 20 determines the cross-sectional area of the passage between the adjacent chambers.

The member 38 has also four segmental portions 40 depending from the upper plate of the member at the inner periphery of the annulus. The segments 40 and the outer flange of the member 38 form an annular channel within which the vanes 30 are moved, the clearance between the vanes and the walls of the channel being of the order of .002" to prevent frictional contacts while minimizing leakage of fluid around the vanes. The specified clearance between the vanes and the inner and outer walls of the damping chamber is insured by the cooperating pivot pin 31 in bearing 32.

As shown at 46 in Fig. 1 the upper surface of the member 38 is recessed to accommodate a flat annular washer 48. The upper plate of the member 38 is provided with slots 44 registering with the holes 34 in the gates 20 and also registering with slots cut through the washer 48. The upper portions of the springs 25 are housed in the slots 44 and the holes in the annulus 48, the latter being grooved to receive the upper ends of the springs 25 for locking them against the upper surface of the member 38. Four screws 50 pass through holes in the annulus 48, the latter being grooved to receive the upper ends of the springs 25 for locking them against the upper surface of the member 38. Four screws 50 pass through holes in the annulus 48, the segments 40 of the member 38 and into holes tapped in the plate 24, thus uniting the members 48, 38 and 24 into one unitary assembly. Extending through the center holes of the annular members 48 and 38 is a vertical plunger 52 having a reduced shank portion 54 and a lower mushroom-shaped head 56 having a smoothly rounded outer periphery 59 engaging the cam surfaces 27 of the four gates 20. At its upper end the plunger 52 is welded or otherwise secured to a flat metal plate 60 serving as the upper member of a flexible metal bellows 62 terminating at its bottom in a stout annular metal plate 64 welded to a relatively heavy metal annulus 66 mounted on a shoulder 68 cut in the inner wall of the casing 11.

It will be understood that the space between the casings 11 and 16 is filled with liquid and also all of the space above the upper plate 18 of the gyroscope enclosure, except for the space between the plate 60 and the upper portion of the bellows and the plate 12 at the top of the casing 11. Here it should be stated that the expressions "upper" and "lower" as used herein, refer to the orientation of the device as shown in Figs. 1 and 3 and has no connotation with respect to the position of the device in use.

Provision may be made to prevent movement of the gimbal 16 in a direction parallel to the axis of the case 11 by, for example, a torsion bar suspension of the gimbal 16 at its end opposite the damping mechanism. If it is desired, though, controlled axial movement of the gimbal may be achieved by constructing the gimbal 16 of material of a higher coefficient of thermal expansion than that of the material of case 11 and restraining the end of the gimbal opposite the damping mechanism from movement axially within the case. In these circumstances, the axial clearance between the gimbal 16 and plate 18 will decrease with increasing temperature because the axial length of the gimbal will increase a greater amount than will the case. Similarly, the clearance between the top surfaces of vanes 30, 30a, 30b and 30c and the adjacent flat surface of the damper annulus 38 will decrease.

Conversely, with decreasing temperature, axial clearance will increase and provide a larger leakage path around the vanes 30, 30a, 30b and 30c. In this manner a slight degree of damping compensation may be made available. The entire effect is lacking where gimbal and case are of the same material, of course, and in any event, the effect is of much less significance than that described in detail below.

In the operation of the device, the gyroscope 14 will be subjected to certain input rates which cause limited rotation of the gimbal structure, including the vanes 30, 30a, 30b and 30c. As hereinbefore stated, the device permits rotation of the vanes 30 through about 10 degrees within the slots 26 of the plate 24. The movement of the vanes 30 impels a flow of fluid from one of the chambers adjacent each vane to the other, according to the direction of movement of the vanes. The fluid must flow through the orifices 70 at the outer end of each gate 20 and the effective resistance to the flow is, of course, a function of the radial position of the gates. Here it should be emphasized that in any device operated for movement in a fluid there will be a considerable degree of what may be termed "natural" damping, inherent in the nature of the structure. The natural damping varies widely with the viscosity of the fluid, thus introducing an error due to temperature variations. The objective of the invention therefore is to introduce an additional damping force which varies in an equal but opposite manner from the variation of the natural damping force, the result being that at all temperatures the sum of the "natural" and compensating damping forces is the same. The "natural" damping force is high at low temperatures and vice versa; the value of the natural damping force follows a steep, non-linear curve. Hence the value of the compensating damping force must follow the reciprocal curve.

The bellows 62, by reason of its resilience, conforms in volume to the volume of fluid within it. As the temperature of the liquid in the system increases, the fluid expands, and the volume of the bellows 62 also increases to take up the fluid expansion, causing the plunger to move upwardly and thus move each of the gates 20 outwardly from the center of the device toward the periphery, thus reducing the cross-sectional arrangement of the orifices 70 through which the liquid flows in response to the rotation in either direction of the vanes 30. The function of the springs 25 is merely to urge the gates inwardly into operating contact with the cam surface 59 of the plunger head 56.

Since the movement of the gates outwardly increases the value of the compensating damping force introduced into the system, it follows that the outward movement of the gates in response to increases in temperature must be proportional to the desired curve of increase in the value of the compensating damping force. Consequently the cam profiles carved on the inner ends of the gates also must take the shape of the desired curve. As best shown in Fig. 1 the cam surfaces of the gates are profiled to cause an initial relatively large movement outwardly, as the plunger lifts, and a subsequent lesser movement in response to the further lifting of the plunger. The result is that the sum of the natural damping force of the system and the added compensated damping force is the same at all temperatures since the curve of the compensating damping force is the reciprocal of the curve of the natural damping force.

The invention provides "dashpot" damping without introducing friction between the piston and the cylinder, if the vanes be considered pistons and the annular channel in which they rotate the cylinder. The cylindrical inner and outer surfaces of the vanes and the cylindrical surfaces of the annular channel are easily formed to a high degree of accuracy because cylindrical surfaces are relatively simple to machine. Thus, clearances are held to extremely close tolerances.

It should be clearly understood and appreciated that the embodiment of the invention illustrated in the drawings and described herein is but typical and that persons skilled in the art would readily appreciate that the invention could be incorporated in different modes. For example, the gates could so be arranged with respect to the other elements of the device as to control the cross-sectional arrangement of liquid passages located adjacent the center of the device rather than at the outer periphery as herein shown. Moreover, while a flexible metal bellows has proved satisfactory in operation, as a device responsive to volume changes caused by thermal expansion, the bellows can be replaced by a thermostat coupled to the plunger.

Having now disclosed our invention what we claim as new and desire to secure by Letters Patent of the United States is:

1. A device for damping the movement of a mass, comprising a casing containing the mass to be damped, walls forming a passage within said casing, fluid filling said casing and passage, a fluid impelling member disposed in the fluid and connected for movement with the mass without touching the casing, a gate mounted to slide within said casing to valve said passage, a plunger mounted for reciprocation within the casing, the gate and plunger having co-acting cam surfaces in contact one with another whereby movement of the plunger causes the gate to slide, and means for reciprocating the plunger in response to variations in temperature of the fluid.

2. A device for damping the movement of a mass, comprising a casing containing the mass to be damped, walls forming a passage within said casing, fluid filling said casing and passage, a fluid impelling member disposed in the fluid and connected for movement with the mass without touching the casing, a gate mounted to slide within said casing to valve said passage, a plunger mounted for reciprocation within the casing, the gate and plunger having co-acting cam surfaces in contact one with another whereby movement of the plunger causes the gate to slide, and means for reciprocating the plunger in response to variations in temperature of the fluid, said cam surfaces being profiled to correspond to the opposite curve of variation in damping force with variations in the temperature of the fluid.

3. A constant damping device for a movable mass, comprising a cylindrical casing, a disk disposed within the casing for rotation about the long axis thereof, a plurality of damper vanes mounted on said disk in radial array, a radially movable gate disposed between each pair of damper vanes within the casing, walls within the casing surrounding but not touching the damper vanes, forming chambers between each pair of vanes and fluid passages regulated by the gates, the gates serving as slidable partitions dividing each chamber in two, fluid filling said casing, and means responsive to variations in the temperature of the fluid for moving the gates to regulate the flow of fluid through the passages from one half of each chamber to the other.

4. A constant damping system for a movable mass comprising a housing, a damping fluid substantially filling said housing, radially movable gates disposed within said housing, walls within said housing cooperating with said radially movable gates to form variable orifices, movable damper vanes attached to the mass and extending within said housing adjacent said radially movable gates but not touching said walls, and a device for moving said radially movable gates in response to changes in temperature to vary the area of said orifices and thereby to provide controlled resistance as a function of temperature by said fluid to movement of said damper vanes.

5. Apparatus for providing constant damping of a device having at least a movable element comprising vanes attached to said element, a housing surrounding said element and said vanes, a damping fluid substantially filling said housing, movable gates disposed adjacent said vanes, walls within said housing defining with said movable gates at least one orifice, and means for moving said gates to vary the size of said orifice in response to changes in temperature, whereby the mobility of said fluid is varied and the resistance to movement of said vanes is controlled.

6. Apparatus for providing constant damping of an instrument having at least a rotatable gimbal comprising, a cylindrical housing surrounding said gimbal, vanes extending from said gimbal adjacent the inner wall, and in planes radial of said cylindrical housing, a damping fluid substantially filling said housing, radially slidable gates disposed adjacent said vanes within said cylindrical housing and defining with the inner wall of said cylindrical housing orifices varying in size with the disposition of said gates, a temperature-responsive element, and means connecting said element to said radially slidable gates to vary the size of said orifices with changes in temperature, whereby said fluid exhibits a predetermined resistance to rotation of said gimbal.

7. Apparatus for providing constant damping of an instrument having at least a rotatable gimbal comprising a cylindrical housing surrounding said gimbal, vanes extending from said gimbal in planes which include the axis of said cylindrical housing, walls within said housing forming fluid passages, an expansible bellows communicating with said housing, a damping fluid substantially filling said housing and said bellows, radially slidable gates disposed adjacent said vanes within said housing and regulating fluid flow through the passages, said damping fluid being constrained to flow through said passages in response to rotation of said gimbal and movement of said vanes, and a plunger connected to said bellows and operative to displace said radially slidable gates in response to changes in volume of said bellows.

8. Apparatus for providing constant damping of a gyroscope having at least a gimbal rotatable in a cylindrical housing comprising a plurality of vanes attached to said gimbal, each being disposed along a radius, and adjacent the inner wall of said cylindrical housing, a like plurality of gates radially slidable in said housing and interposed between said vanes, the outermost ends of said gates defining with inner wall of said housing openings of variable size, an expansible bellows sealed to said housing and communicating with the interior thereof, a damping fluid substantially filling said housing and said bellows, a plunger attached to said bellows and bearing on said gates, changes in temperature causing volumetric changes in said fluid and changes in the size of said bellows, said plunger being moved by said bellows and actuating said gates to vary the size of said openings.

9. Apparatus as in claim 8 wherein the temperature coefficient of viscosity of said damping fluid and the bearing surfaces of said plunger and gates are selected to provide a predetermined amount of damping of said gimbal rotation over a wide range of temperature.

10. Fluid damping apparatus for a gyroscope having at least a movable gimbal comprising a container, fluid substantially filling said container, means for varying the size of the container of said fluid to compensate for volumetric changes in said fluid due to changes in temperature, walls forming variable orifices within said container, and means actuated by said first-mentioned means for varying the size of said orifices, said fluid being constrained to flow through said orifices by movement of said gimbal, whereby constant total damping of movement of said gimbal is provided.

11. Fluid damping apparatus for a gyroscope having at least a movable gimbal comprising a chamber of variable size, a fluid substantially filling said chamber, means connected to said gimbal for forcing said fluid to flow through a predetermined path in said chamber, walls forming variable orifices traversed by the fluid in the path, and means responsive to changes in the size of said chamber for varying the size of said orifices, said orifices increasing in size with decreases in size of said chamber and decreasing in size with increases in size of said chamber whereby constant total damping of movement of said gimbal is provided.

12. Fluid damping apparatus for a gyroscope having at least a gimbal rotatable in a cylindrical housing comprising a plurality of vanes mounted on said gimbal and rotatable therewith in said cylindrical housing a like plurality of radially movable gate members interposed between said vanes and defining with the inner wall of said housing variable orifices, an expansible bellows having its end sealed to said housing and communicating with the interior thereof, a damping fluid having a relatively low temperature coefficient of viscosity substantially filling said housing and said bellows, a plunger attached to the end of said bellows opposite the end sealed to said housing and movable therewith, said gate members having contoured bearing surfaces formed thereon, and springs for maintaining said contoured bearing surfaces in contact with said plunger, the contour of said bearing surfaces being related to the temperature coefficient of viscosity of said damping fluid to vary the size of said orifices to provide constant total damping forces on said rotatable gimbal over wide ranges of temperature.

13. Fluid damping apparatus for an instrument having at least a movable mass comprising a container housing said movable mass and a quantity of fluid, means for varying the size of said container to accommodate volumetric changes in said fluid due to changes in temperature, vanes attached to said mass and disposed in close proximity to the inner wall of said container, means forming with said inner wall of said container variable orifices within said container, and means actuated by said first-mentioned means for varying the size of said orifices, rotational movement of said movable mass causing said vanes to force said fluid to flow through said variable orifices, whereby constant total damping forces on said vanes are provided.

14. Fluid damping apparatus for a gyroscope having at least a gimbal rotatable in a cylindrical housing comprising a plurality of vanes mounted on said gimbal and rotatable therewith in said cylindrical housing, said vanes having cylindrical outer surfaces disposed in close proximity to the cylindrical inner wall of said cylindrical housing and being capable of movement relative thereto without frictional contact therewith, a like plurality of radially movable gate members interposed between said vanes, disk members disposed coaxially with said housing at opposite ends of said gate members, said disk members, said inner wall of said housing and said radially movable gate members defining variable orifices within said housing, an expansible bellows having an open end thereof sealed to said housing and communicating with the interior thereof, a damping fluid having a relatively low temperature coefficient of viscosity substantially filling said housing and said bellows, a plunger attached to the end of said bellows opposite the end sealed to said housing and movable therewith, said plunger extending into said housing, said gate members having contoured bearing surfaces formed on the inner surfaces thereof, and springs for maintaining said contoured bearing surfaces in contact with the end of said plunger within said housing, the contour of said bearing surfaces being related to the temperature coefficient of viscosity of said fluid to vary the size of said orifices to provide constant total damping forces on said rotatable gimbal over wide ranges of temperature.

References Cited in the file of this patent

UNITED STATES PATENTS

| | | |
|---|---|---|
| 1,881,957 | Peo | Oct. 11, 1932 |
| 2,013,109 | Reynolds | Sept. 3, 1935 |
| 2,038,596 | Peo | Apr. 28, 1936 |
| 2,303,454 | Hanna | Dec. 1, 1942 |
| 2,718,149 | Bamford et al. | Sept. 20, 1955 |